US009842565B2

United States Patent
Kim et al.

(10) Patent No.: US 9,842,565 B2
(45) Date of Patent: Dec. 12, 2017

(54) CONTROLLER FOR IN-VEHICLE ETHERNET AND CONTROL METHOD THEREOF

(71) Applicant: Hyundai Motor Company, Seoul (KR)

(72) Inventors: Dong Ok Kim, Gyeonggi-Do (KR); Jin Hwa Yun, Seoul (KR)

(73) Assignee: Hyuandai Motor Company, Seoul (KR)

( * ) Notice: Subject to any disclaimer, the term of this patent is extended or adjusted under 35 U.S.C. 154(b) by 271 days.

(21) Appl. No.: 14/526,343

(22) Filed: Oct. 28, 2014

(65) Prior Publication Data

US 2015/0228246 A1    Aug. 13, 2015

(30) Foreign Application Priority Data

Feb. 13, 2014   (KR) .................. 10-2014-0016522

(51) Int. Cl.
*G09G 5/00*       (2006.01)
*H04L 29/06*      (2006.01)
(Continued)

(52) U.S. Cl.
CPC ............... *G09G 5/006* (2013.01); *G06F 3/14* (2013.01); *G06T 1/20* (2013.01); *G09G 5/12* (2013.01);
(Continued)

(58) Field of Classification Search
None
See application file for complete search history.

(56) References Cited

U.S. PATENT DOCUMENTS 4,739,510 A    4/1988   Jeffers et al.
2004/0181610 A1*  9/2004   Walker .................. G06F 9/5044
                                           709/250

(Continued)

FOREIGN PATENT DOCUMENTS

JP    2004-030044 A    1/2004
JP    2006-173673 A    6/2006
(Continued)

OTHER PUBLICATIONS

Korean Notice of Allowance cited in KR 10-2014-0016522, dated Jan. 28, 2015.

*Primary Examiner* — Vu Nguyen
*Assistant Examiner* — Nurun N Flora
(74) *Attorney, Agent, or Firm* — Mintz Levin Cohn Ferris Glovsky and Popeo, P.C.; Peter F. Corless (57) ABSTRACT

In-vehicle communication and, more particularly, a controller operating an in-vehicle Ethernet environment and a control method thereof are disclosed. A controller operating in an in-vehicle Ethernet network includes a central processing unit (CPU) and a physical layer (PHY) device connected to the CPU through a first interface, a second interface, and a first pin, wherein the PHY device includes a decoder, the PHY device being configured based on a predetermined configuration value for initialization irrespective of booting of an operating system of the CPU, and the decoder decodes compressed video data received from an external source through the Ethernet network into uncompressed video data and transmits the uncompressed video data to the external source after initialization of the PHY device is completed based on configuration of the first pin.

17 Claims, 6 Drawing Sheets

(51) Int. Cl.
*H04L 12/413* (2006.01)
*H04N 21/414* (2011.01)
*H04N 21/4223* (2011.01)
*G06F 3/14* (2006.01)
*G09G 5/12* (2006.01)
*G06T 1/20* (2006.01)
*H04L 29/12* (2006.01)
*H04L 29/08* (2006.01)
*H04L 12/46* (2006.01)
*H04N 5/232* (2006.01)
*H04N 21/2381* (2011.01)

(52) U.S. Cl.
CPC ............ *H04L 12/413* (2013.01); *H04L 65/00* (2013.01); *H04L 69/04* (2013.01); *H04N 21/41422* (2013.01); *H04N 21/4223* (2013.01); *G09G 2370/16* (2013.01); *G09G 2380/10* (2013.01); *H04L 12/46* (2013.01); *H04L 61/6022* (2013.01); *H04L 67/12* (2013.01); *H04L 67/34* (2013.01); *H04N 5/23206* (2013.01); *H04N 21/2381* (2013.01)

(56) References Cited

U.S. PATENT DOCUMENTS

| | | | |
|---|---|---|---|
| 2006/0221846 A1* | 10/2006 | Dyck | H04L 12/4633 370/252 |
| 2006/0224754 A1 | 10/2006 | Jain et al. | |
| 2012/0213211 A1 | 8/2012 | Remaker | |
| 2013/0115880 A1 | 5/2013 | Dal Bello et al. | |
| 2013/0159489 A1* | 6/2013 | Cha | H04L 41/0809 709/223 |
| 2015/0146745 A1* | 5/2015 | Kim | H04L 12/12 370/466 |
| 2016/0191973 A1* | 6/2016 | Joy | H04N 21/26216 725/75 |

FOREIGN PATENT DOCUMENTS

| | | |
|---|---|---|
| KR | 10-0630935 B1 | 9/2006 |
| KR | 10-2007-0085799 | 9/2009 |
| KR | 10-2013-0123715 | 11/2013 |
| KR | 10-1443276 | 9/2014 |

* cited by examiner

CONTROLLER FOR IN-VEHICLE ETHERNET AND CONTROL METHOD THEREOF

CROSS-REFERENCE TO RELATED APPLICATION

This application claims the benefit of Korean Patent Application No. 10-2014-0016522, filed on Feb. 13, 2014, which is hereby incorporated by reference as if fully set forth herein.

BACKGROUND

Technical Field

The present disclosure relates to in-vehicle communication and, more particularly, to a controller operating an in-vehicle Ethernet environment and a control method thereof.

Discussion of the Related Art

Generally, a media oriented system transport (MOST) mode or a low voltage differential signal (LVDS) mode has been used for multimedia-related networks requiring high-speed data transmission in a vehicle.

The above modes may be replaced by commercial Ethernet for communication between controllers in a vehicle. It is possible to increase communication speed through the use of such commercial Ethernet. In addition, it is possible to reduce system configuration cost by configuring the system using inexpensive parts. Furthermore, it is possible to simply maintain a wiring and connection structure by connecting an electronic control unit (ECU) local network to one main system bus.

In a case in which an Ethernet mode is used, a controller that includes a central processing unit (CPU) and a physical layer (PHY) device (for example, a PHY chip) can enable the CPU to be connected to an external device therethrough. The PHY device takes charge of a physical layer; that is, the PHY device takes charge of connecting to a device that is outside the system. More specifically, the PHY device receives an external signal, converts the received signal into a signal that can be used by the CPU, decodes or demodulates encoded or modulated data into an original packet form, and transmits the packet form to the CPU (e.g. using a transceiver).

When booting of the CPU is completed, the PHY device receives a configuration value necessary for the PHY device to operate from the CPU through serial communication such that the PHY device is ready to operate. For this reason, normal operation of the PHY device is not guaranteed during booting of the CPU. However, a plurality of ECUs provided in a vehicle may have various CPUs and operate based on different operating systems (OSs). As a result, the controllers may have different booting times of the CPUs.

For this reason, in a case in which two or more different ECUs (e.g. a controller of a rear view camera and a controller of a head unit display) need to communicate with each other through PHY devices thereof to perform one function, the respective PHY device may not normally operate if booting of the CPU of one of the ECUs is delayed, thereby delaying execution of other functions. In addition, a media access control (MAC) address may not be assigned to the PHY device before booting of the CPU is completed, and as such, the desired Ethernet operation may not be possible.

SUMMARY

Accordingly, the present disclosure is directed to a controller for in-vehicle Ethernet and a control method thereof that substantially obviate one or more problems due to limitations and disadvantages of the related art.

An object of the present disclosure is to provide a controller that is capable of more efficiently operating in an in-vehicle Ethernet network and a control method thereof.

Another object of the present disclosure is to provide a controller including a physical layer device that is capable of completing configuration and commencing communication even before booting of a central processing unit and a control method thereof.

Another object of the present disclosure is to provide a controller including a physical layer device that is capable of operating with a media access control (MAC) address even before booting of a central processing unit and a control method thereof.

A further object of the present disclosure is to provide a controller that is capable of displaying an image received from a vehicle camera as rapidly as possible and a control method thereof.

Additional advantages, objects, and features of the disclosure will be set forth in part in the description which follows and in part will become apparent to those having ordinary skill in the art upon examination of the following or may be learned from practice of the embodiments disclosed herein. The objectives and other advantages of the embodiments may be realized and attained by the structure particularly pointed out in the written description and claims hereof as well as the appended drawings.

To achieve these objects and other advantages and in accordance with the purpose of the disclosure, as embodied and broadly described herein, a controller operating in an in-vehicle Ethernet network includes a central processing unit (CPU) and a physical layer (PHY) device connected to the CPU through a first interface, a second interface, and a first pin, wherein the PHY device includes a decoder and is configured based on a predetermined configuration value for initialization irrespective of booting of an operating system of the CPU, and the decoder decodes compressed video data received from an external source through the Ethernet network into uncompressed video data and transmits the uncompressed video data to the external source after initialization of the PHY device is completed based on configuration of the first pin.

In another aspect of the present disclosure, a control method of a multimedia system operating on an in-vehicle Ethernet network includes commencing booting of a controller of a head unit including a CPU and a PHY device connected to the CPU through a first interface, a second interface, and a first pin, initializing the PHY device based on a predetermined configuration value irrespective of booting of an operating system of the CPU, the PHY device receiving compressed video data, a decoder provided in the PHY device decoding the compressed video data into uncompressed video data, and transmitting the decoded uncompressed video data to a display.

It is to be understood that both the foregoing general description and the following detailed description of the present disclosed embodiments are exemplary and explanatory and are intended to provide further explanation of the embodiments as claimed.

BRIEF DESCRIPTION OF THE DRAWINGS

The accompanying drawings, which are included to provide a further understanding of the present disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Reference will now be made in detail to the preferred embodiments of the present disclosure, examples of which are illustrated in the accompanying drawings. The suffixes "module" and "unit" of elements herein are used for convenience of description and thus can be used interchangeably and do not have any distinguishable meanings or functions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the present disclosure, Ethernet is applied to an in-vehicle network. In a case in which an in-vehicle network is developed using Ethernet, it is possible to achieve faster communication speeds than a conventional in-vehicle network and to conduct research and development using existing commercial equipment (e.g. an Ethernet communication chip, a cable, a hub, etc.) with reduced cost and time. Hereinafter, physical layer (PHY) device will be referred to as a PHY chip on the assumption that the PHY device is embodied as a chip. However, this is designated for the sake of convenience and, therefore, the PHY device may be embodied as various electronic devices in addition to the chip.

Figure 1:
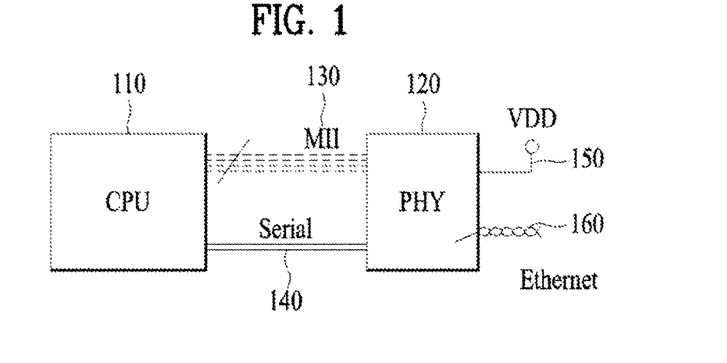
FIG. 1 is a block diagram showing an example of the structure of an in-vehicle controller including a central processing unit (CPU) and a physical layer (PHY) chip.

First, the structure of an in-vehicle controller will be described with reference to FIG. 1. FIG. 1 is a block diagram showing an example of the structure of an in-vehicle controller including a central processing unit (CPU) and a PHY chip.

Referring to FIG. 1, the in-vehicle controller may include a CPU 110 and a PHY chip 120. The CPU 110 and the PHY chip 120 may be connected to each other through a media independent interface (MII) 130 and/or serial communication 140. MII is a commercial Ethernet standard defined in IEEE 802.3. MII includes a data interface and a management interface between a media access control (MAC) layer and a physical layer (PHY). The data interface separately includes a transmitter channel and a receiver channel, which each have an individual clock, data, and control signal. The management interface may include a data clock signal for management and a data interface signal. When booting of the CPU 110 is completed through the serial communication 140 as previously described, the CPU 110 may transmit a configuration value necessary to drive the PHY chip 120. In addition, the in-vehicle controller may further include a power supply unit 150 to supply power to the PHY chip 120 and an interface 160 to allow the in-vehicle controller to be connected to another controller over Ethernet.

Figure 2:
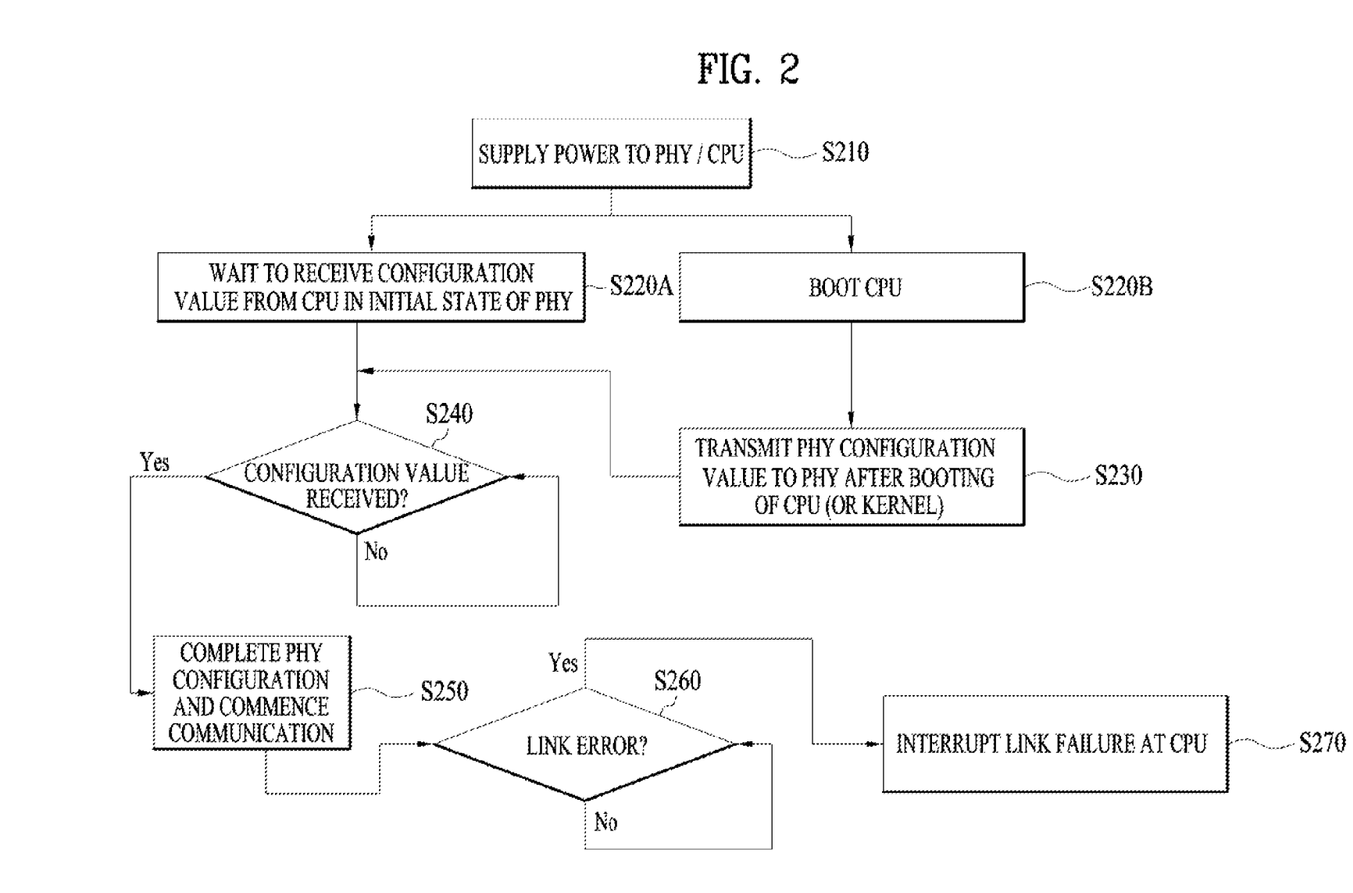
FIG. 2 is a flowchart showing an example of an operational process of the CPU and the PHY chip in the controller configured as shown in FIG. 1.

Next, an operational process of the controller configured as shown in FIG. 1 will be described with reference to FIG. 2. FIG. 2 is a flowchart showing an example of an operational process of the CPU and the PHY chip in the controller configured as shown in FIG. 1.

Referring to FIG. 2, when power is supplied to the controller (S210), operations of the CPU and the PHY chip are commenced. Specifically, the PHY chip waits to receive a configuration value from the CPU in an initial state (S220A) and the CPU performs booting of an operating system (OS) (or kernel load) (S220B). When booting of the CPU is completed, the CPU transmits a configuration value necessary to operate the PHY chip to the PHY chip through serial communication (S230). When the PHY chip successfully receives the configuration value from the CPU (S240), the PHY chip is configured based on the received value such that the PHY chip is ready to perform communication (S250). Subsequently, the CPU may (or may not) monitor a link error of Ethernet (S260) and determine a link failure based thereupon (S270).

Figure 3:
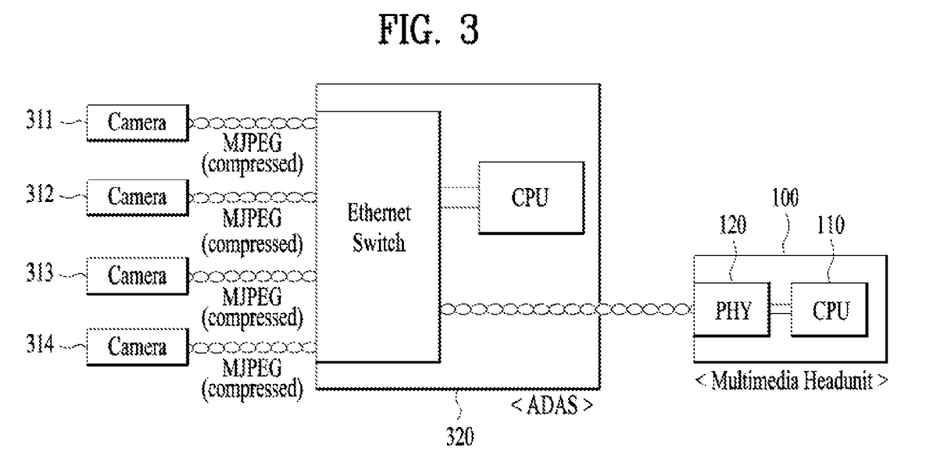
FIG. 3 is a view showing an example of the structure of a vehicle camera system.

The structure of a camera system in a case in which the controller configured and operated as described above is applied to a multimedia head unit of a vehicle is shown in FIG. 3. FIG. 3 is a view showing an example of the structure of a vehicle camera system.

Referring to FIG. 3, a vehicle may include a single rear camera 311 or a plurality of cameras 311 to 314 to record video in all directions. These cameras transmit video recorded in a compressed video data format (satisfying any potential bandwidth requirements of Ethernet) to a video composition device 320. An example of the video composition device may be an advanced driver assistance system (ADAS). Output of the video composition device 320 is transmitted to an electronic control unit (ECU) of a multimedia head unit 100. Based on the configuration of the in-vehicle camera system, the cameras may be directly connected to the multimedia head unit 100, for example, rather than via the video composition device 320.

In FIG. 3, an MJPEG format is illustratively shown as being used as the compressed video format. However, the present disclosure is not limited thereto. Any video format may be used as the compressed video format. This may be equally applied to FIG. 5, which will hereinafter be described.

The relevant North American vehicle regulations prescribe that a driver should switch on the ignition and put a gearbox in a backward movement mode within a short period of time after the driver gets in the vehicle. However, more time is needed for the ECU of the multimedia head unit to boot an operating system (OS) through a CPU 110 in the network with the above-stated configuration. Although keyless remote entry (KRE) is applied such that booting of the head unit ECU is commenced simultaneously with opening of a vehicle door, the result may not be greatly changed.

That is, a PHY chip may not receive a configuration value before booting of the OS through the CPU is completed, resulting in the PHY chip not being ready to operate. Although compressed video data are transmitted through the PHY chip, decoding the data may be difficult within the above time requirement. If the PHY chip is configured irrespective of whether booting of the OS through the CPU is completed and compressed video data are supplied to the CPU as uncompressed video data, however, it may be possible for the CPU to forward the uncompressed video data to a display without operation based on algorithm even before booting of the OS is completed.

Consequently, an embodiment of the present disclosure proposes that 1) the PHY chip have a predetermined configuration value according to a pin instead of the PHY chip receiving a configuration value after booting of the OS through the CPU is completed, and 2) a decoder that is added to the PHY chip to decode compressed video data. In addition, the embodiment of the present disclosure proposes that 3) the decoder performs Ethernet communication using a pseudo MAC address of the CPU before a MAC address is assigned through the CPU.

Hereinafter, the above-referenced aspects of the present disclosure will be described in more detail.

First, configuration of the PHY chip according to the present disclosure will be described. The operational process described with reference to FIG. 2 has an advantage in that the CPU transmits the configuration value to the PHY chip, and thus the PHY chip can be flexibly configured. Unlike general commercial Ethernet, however, elements constituting a network are hardly added to or removed from a vehicle. For this reason, the vehicle has low flexibility. In addition, in-vehicle Ethernet uses network management of an application region rather than link operation. For this reason, it is unnecessary for the CPU to determine a link failure in most cases.

In consideration of such a special case of the in-vehicle Ethernet, the configuration value necessary to operate the PHY chip may not be changed from a specific value. In the end, it may be sufficient for the in-vehicle Ethernet to configure modes based on a relative arrangement relationship with another controller or required speed when the PHY chip is initially installed in the vehicle among a large number of configuration values for the PHY chip. Values changeable based on the modes may include, for example, whether the PHY chip will function as a master or a slave, operation speed, and the like. Notably, the present disclosure is not limited thereto.

In an embodiment of the present disclosure, therefore, configuration values necessary to operate the PHY chip may be prestored in the PHY chip instead of receiving the configuration value from the CPU, such that the PHY chip can be configured using the stored values or the PHY chip may be ready to operate based on a state of a pin used to set operation modes. In this case, configuration of the PHY chip is completed during booting of the CPU, whereby it is possible to rapidly drive the PHY chip irrespective of whether or not booting of the CPU is completed.

Next, the decoder and the pseudo MAC address will be described. The decoder decodes compressed video data received from the camera(s) (or the video composition device) into uncompressed video data in a state in which it is ready to drive through the above pin. As a result, the CPU may forward the uncompressed video data to the display of the head unit even in a state in which booting of the OS is completed, such that the video recorded by the cameras is reproduced on the display. Of course, the uncompressed video data decoded by the decoder may be directly transmitted to the display of the head unit or another connected device capable of forwarding the uncompressed video data to the display of the head unit not via the CPU based on network configuration.

Meanwhile, the decoder does not generally have a MAC address. In the Ethernet, however, the MAC address is necessary to become a data addressee. Consequently, the MAC address of the CPU may be received and stored, and then the stored MAC address of the CPU may be used as a pseudo MAC address until booting of the OS through the CPU is completed, thereby disabling the function of the decoder. A process of storing MAC address information of the CPU will hereinafter be described in more detail with reference to FIG. 7. A MAC processing module may be added to the decoder to use the MAC address and decode Ethernet packets.

Figure 4:
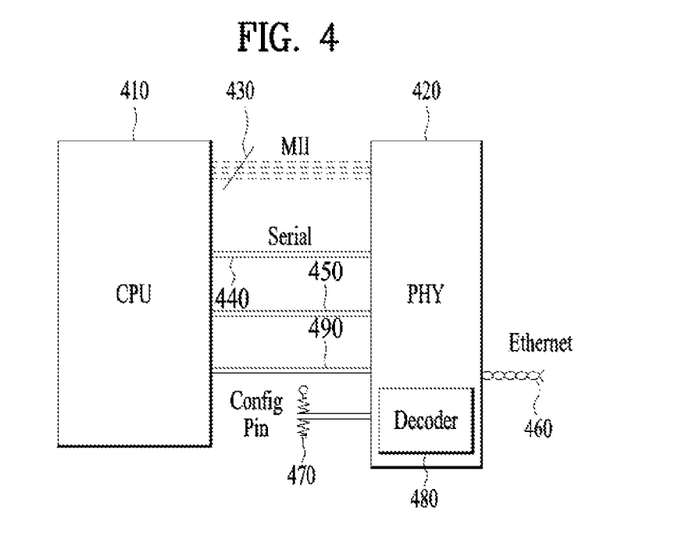
FIG. 4 is a view showing an example of the structure of an electronic control unit (ECU) according to an embodiment of the present disclosure.

The structure of an ECU to which the above characteristics are applied will be described with reference to FIG. 4. FIG. 4 is a view showing an example of the structure of an ECU according to an embodiment of the present disclosure.

Referring to FIG. 4, the controller may include a CPU 410 and a PHY chip 420. The CPU 410 and the PHY chip 420 may be connected to each other through an MII 430 and serial communication 440. In addition, the controller may be connected to a network through an Ethernet interface 460.

The PHY chip 420 may be further provided with a configuration pin 470 to configure whether the PHY chip 420 will function as a master or a slave, as well as the operation speed.

The configuration pin 470 may be a hardware switch. The configuration pin 370 may configure whether the PHY chip 320 will function as a master or a slave, as well as operation speed. This is because the PHY chip 420 may function as a master or a slave according to configuration of the CPU in commercial Ethernet, whereas the controller operates in a fixed mode without change in role thereof based on a position at which the controller is disposed in the vehicle when the controller is delivered from a factory. In a case in which the controller is mounted at a switch position of the Ethernet network, the controller functions as a master. On the other hand, in a case in which the controller is mounted at an end-point of the Ethernet network, the controller functions as a slave. An example of the configuration pin may be general purpose input output (GPIO). Of course, in a case in which the PHY chip is configured to have one predetermined value, the configuration pin 470 may be omitted.

Meanwhile, configuration values necessary to configure the PHY chip may accurately define only functions necessary for the in-vehicle PHY chip per pin, such that additional configuration from the CPU is not needed. To this end, in an example of this embodiment, configuration values necessary to drive the PHY chip may be stored in a register (e.g. pull-up register or pull-down register) to store a pull-up/pull-down configuration (generally defining an input state under a condition that there is no signal in a digital device). Of course, the configuration values may be stored in an additional memory region (not shown), in addition to the pull-up/pull-down register.

In addition, the PHY chip may include a decoder 480. Between the PHY chip and the CPU may be provided a control interface 450 to control operation of the PHY chip. When booting of the OS through the CPU is completed, the CPU may enable the decoder 480 and signal the PHY chip to operate as a general Ethernet PHY chip through the control interface 450. Subsequently, compressed video data may be decoded through the CPU and displayed. The PHY chip may operate through the MII under control of the CPU. When such signaling is not received, on the other hand, the PHY chip may regard all data input from an external source as compressed video data and perform decoding through the decoder 480. The control interface 450 may be formed in the shape of a pin. Meanwhile, the decoder 480 and the CPU may be connected to each other via a video transmission interface 490. The decoder may transmit uncompressed video data to the CPU through the video transmission interface 490 such that the uncompressed video data can be forwarded to the display through the CPU. As previously described, the uncompressed video data decoded by the decoder may be directly transmitted to the display of the head unit or another connected device capable of forwarding the uncompressed video data to the display of the head unit not via the CPU based on network configuration. In this case, the video transmission interface 490 may be connected to the display of the head unit or another proper device, not the CPU.

Figure 5:
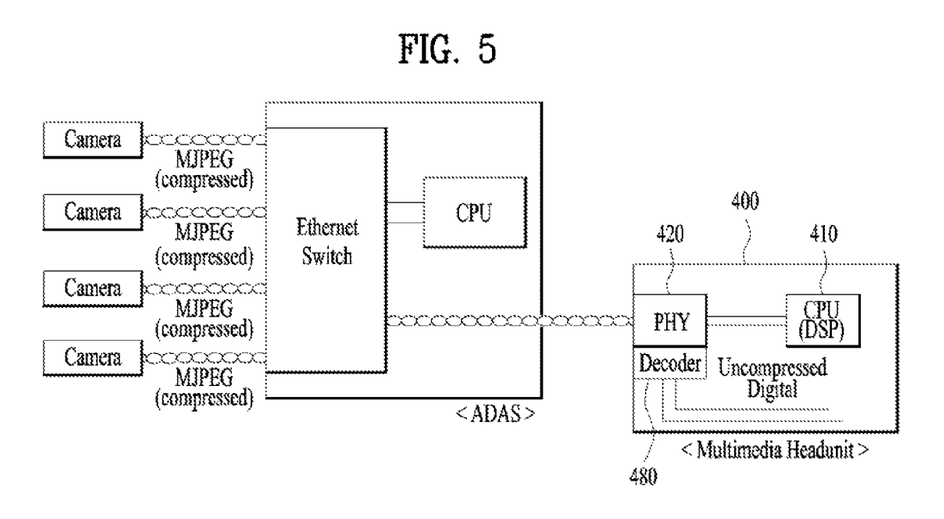
FIG. 5 is a view showing an example of the structure of a vehicle camera system to which a controller according to an embodiment of the present disclosure is applied.

The structure of a camera system in a case in which the controller configured and operated as described above is applied to a multimedia head unit of a vehicle is shown in FIG. 5. FIG. 5 is a view showing an example of the structure of a vehicle camera system to which a controller according to an embodiment of the present disclosure is applied.

Referring to FIG. 5, the decoder 480 is included in the PHY chip 420 of the head unit ECU 400. When compressed video recorded through the cameras is transmitted through the video composition device, therefore, the compressed video may be decoded and directly displayed through the display even when booting of the OS through the CPU 410 is not completed.

Figure 6:
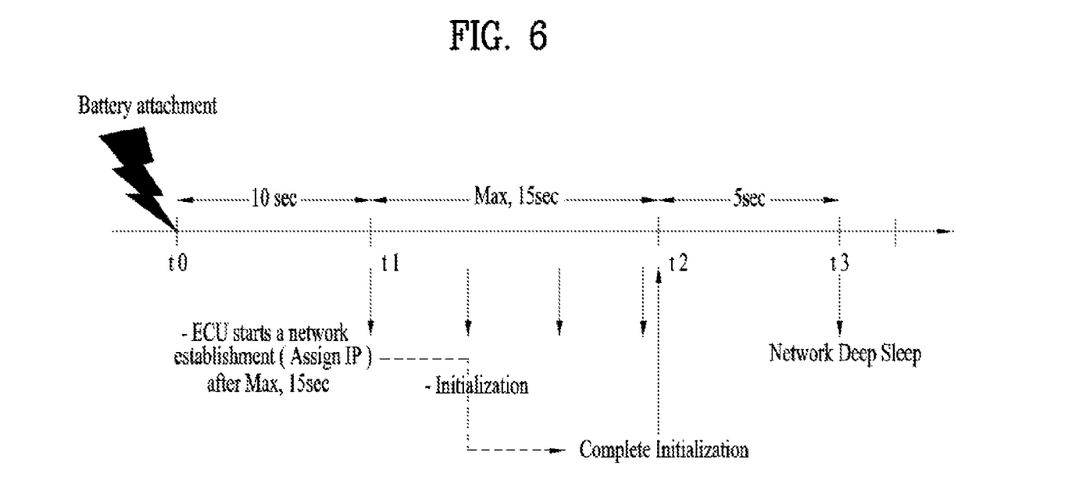
FIG. 6 is a view showing an example of a process of a decoder according to an embodiment of the present disclosure acquiring a pseudo media access control (MAC) address from the CPU.

Hereinafter, a process of the decoder acquiring pseudo MAC address information will be described with reference to FIG. 6 before operation of the controller according to the embodiment of the present disclosure is described in more detail. FIG. 6 is a view showing an example of a process of a decoder according to an embodiment of the present disclosure acquiring a pseudo MAC address from the CPU.

Generally, when a battery is attached to a vehicle during assembly of the vehicle at a factory, each ECU may be first initialized. In this embodiment, the pseudo MAC address may be transmitted from the CPU to the decoder during first initialization. More specifically, power is supplied to the CPU as the result of battery attachment such that booting of the CPU is commenced at t0. When booting of the CPU is completed at t1, the MAC address of the CPU may be transmitted to the PHY chip through a serial interface (MDIO). As a result, the decoder may designate and store the MAC address of the CPU as a pseudo MAC address at t1 to t2. After t3, the network may enter a sleep mode.

Figure 7:
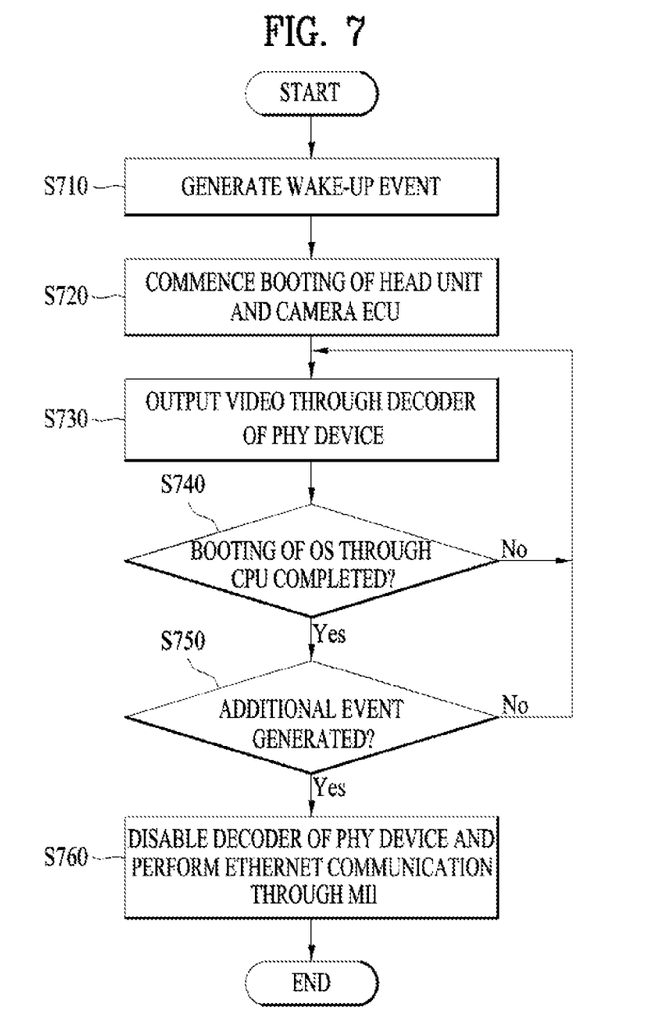
FIG. 7 is a view showing an example of an operational process of the structure of the vehicle camera system to which the controller according to the embodiment of the present disclosure is applied.

Hereinafter, an operational process of the controller according to the embodiment of the present disclosure will be described in more detail with reference to FIG. 7. FIG. 7 is a view showing an example of an operational process of the structure of the vehicle camera system to which the controller according to the embodiment of the present disclosure is applied.

Referring to FIG. 7, when a wake-up event is first generated (S710), booting of the head unit ECU and the camera ECU may be commenced (S720). An example wake-up event may include a case in which a door opening is sensed in the KRE system, or a case in which the key box is in an accessory (ACC) power mode or IGN1 power mode. Notably, these cases are merely illustrative. Any event may be used so long as the event relates to a criterion of operational commencement of the camera system.

Generally, it can take about 5 to 15 seconds to boot the CPU of the head unit ECU. Consequently, initialization of the PHY chip (i.e. initialization based on a configuration value), which needs about 20 ms, may be completed first. At this time, a value prestored based on configuration settings of the configuration pin 470 may be applied as the configuration value of the PHY chip. The decoder may then decode and transmit compressed video data corresponding to video recorded through the cameras to the CPU using a pseudo MAC address. As a result, the video recorded through the cameras may be output through the display of the head unit (S730). Of course, outputting of the video at step S730 may be performed after a camera enabling signal is received (e.g. in a case where the gear box is in a backward movement mode).

Meanwhile, when booting of the OS through the CPU is completed (S740) and an additional event is generated (S750), the CPU may disable the decoder of the PHY device via signaling through the control interface 450 and may perform Ethernet communication through the MII interface (S760). An example of such additional event may illustratively include a case in which a user selects another function (e.g. screen switching) other than the cameras, or a case in which the key box is shifted to another mode other than the backward movement mode. However, the additional event is not limited thereto.

Figure 8:
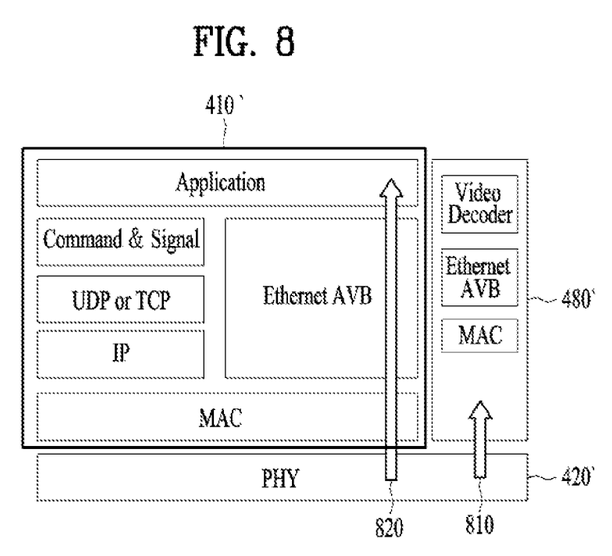
FIG. 8 is a view showing an operational process of a head unit ECU of a vehicle camera system according to an embodiment of the present disclosure in terms of a communication protocol stack.

FIG. 8 is a view showing an operational process of a head unit ECU of a vehicle camera system according to an embodiment of the present disclosure in terms of a communication protocol stack.

Referring to FIG. 8, a physical layer 420' corresponds to the above-described PHY chip, and upper layers 410' (e.g. an application, MAC, IP, and the like) correspond to the CPU. In addition, a video decoder stack 480' corresponds to the decoder. Before booting of the CPU, a video processing process performed by the PHY chip in a standalone state corresponds to a right arrow 810. When an additional event to disable the decoder is generated after booting of the CPU is completed, video processing may be performed according to a left arrow 820.

As is apparent from the above description, it is possible to more efficiently operate a controller through a PHY device according to at least one embodiment of the present disclosure as described above. In particular, operation of the PHY device is configured based on a predetermined value or configuration of a configuration pin. Consequently, it is possible to rapidly commence communication irrespective of booting time of a CPU. In addition, a decoder is provided in the PHY device. Consequently, it is possible to rapidly reproduce compressed video data without assistance of the CPU while satisfying Ethernet speed. Furthermore, the same pseudo MAC address as the CPU is assigned to the decoder provided in the PHY device. Consequently, it is possible to commence Ethernet communication irrespective of booting of the CPU.

It will be appreciated by persons skilled in the art that that the effects that can be achieved through the disclosed embodiments are not limited to what has been particularly described hereinabove and other advantages of the embodiments will be more clearly understood from the above detailed description. It will be apparent to those skilled in the art that various modifications and variations can be made in the embodiments without departing from the spirit or scope of the present disclosure. Thus, it is intended that the disclosed embodiments cover the modifications and variations of this disclosure provided they come within the scope of the appended claims and their equivalents.

What is claimed is:

1. A controller operating on in in-vehicle Ethernet network, the controller comprising:
 a central processing unit (CPU); and
 a physical layer (PHY) device connected to the CPU through a first interface, a second interface, and a first pin, wherein
 the PHY device comprises a decoder, the PHY device being configured based on a predetermined configuration value for initialization irrespective of booting of an operating system of the CPU, and
 the decoder decodes compressed video data received from an external source through the Ethernet network into uncompressed video data and transmits the uncompressed video data to an external destination after initialization of the PHY device is completed based on configuration of the first pin.

2. The controller according to claim 1, wherein the decoder pre-acquires and uses a media access control (MAC) address of the CPU as a pseudo MAC address in the Ethernet network.

3. The controller according to claim 2, wherein the decoder acquires the MAC address of the CPU through the second interface.

4. The controller according to claim 1, wherein
 the decoder is connected to the CPU through a third interface, and
 the CPU transmits the uncompressed video data received through the third interface to a display.

5. The controller according to claim 1, wherein the CPU disables the decoder through the first pin and signals Ethernet physical layer operation through the first interface to the PHY device after booting of the operating system is completed.

6. The controller according to claim 5, wherein the signaling is performed based on generation of a specific event after the booting of the operating system is completed.

7. The controller according to claim 1, wherein
 the first interface is a media independent interface (MII), and
 the second interface is a serial interface.

8. The controller according to claim 1, wherein the PHY device further comprises a second pin, the PHY device being initialized based on a predetermined configuration value according to a configuration state of the second pin irrespective of booting of the operating system of the CPU.

9. A control method of a multimedia system operating in an in-vehicle Ethernet network, the control method comprising:
 commencing booting of a controller of a head unit including a CPU and a PHY device connected to the CPU through a first interface, a second interface, and a first pin;
 initializing the PHY device based on a predetermined configuration value irrespective of booting of an operating system of the CPU, the PHY device receiving compressed video data, and a decoder provided in the PHY device decoding the compressed video data into uncompressed video data; and
 transmitting the decoded uncompressed video data to a display.

10. The control method according to claim 9, wherein the decoder pre-acquires and uses a MAC address of the CPU as a pseudo MAC address in the Ethernet network.

11. The control method according to claim 10, wherein the decoder acquires the MAC address of the CPU through the second interface.

12. The control method according to claim 9, wherein
 the decoder is connected to the CPU through a third interface, and
 the uncompressed video data are transmitted from the CPU to the display through the third interface.

13. The control method according to claim 9, further comprising:
 disabling, by the CPU, the decoder through the first pin; and
 signaling, by the CPU, Ethernet physical layer operation through the first interface to the PHY device after booting of the operating system is completed.

14. The control method according to claim 13, wherein the signaling is performed based on generation of a specific event after the booting of the operating system is completed.

15. The control method according to claim 9, wherein
 the first interface is an MII, and
 the second interface is a serial interface.

16. The control method according to claim 9, wherein the PHY device further comprises a second pin, the PHY device being initialized based on a predetermined configuration value according to a configuration state of the second pin irrespective of booting of the operating system of the CPU.

17. A non-transitory computer readable medium containing program instructions for a multimedia system operating in an in-vehicle Ethernet network, the computer readable medium comprising:
program instructions that commence booting of a controller of a head unit including a CPU and a PHY device connected to the CPU through a first interface, a second interface, and a first pin;
program instructions that initialize the PHY device based on a predetermined configuration value irrespective of booting of an operating system of the CPU, the PHY device receiving compressed video data, and a decoder provided in the PHY device decoding the compressed video data into uncompressed video data; and
program instructions that transmit the decoded uncompressed video data to a display.

* * * * *

UNITED STATES PATENT AND TRADEMARK OFFICE
CERTIFICATE OF CORRECTION

PATENT NO. : 9,842,565 B2
APPLICATION NO. : 14/526343
DATED : December 12, 2017
INVENTOR(S) : Dong Ok Kim et al.

It is certified that error appears in the above-identified patent and that said Letters Patent is hereby corrected as shown below:

On the Title Page

At (73) Assignee:, please replace:
"Hyuandai Motor Company, Seoul (KR)"

With:
"Hyundai Motor Company, Seoul (KR)"

Signed and Sealed this
Second Day of March, 2021

Drew Hirshfeld
*Performing the Functions and Duties of the
Under Secretary of Commerce for Intellectual Property and
Director of the United States Patent and Trademark Office*